US005569436A

United States Patent [19]
Lerner

[11] Patent Number: 5,569,436
[45] Date of Patent: Oct. 29, 1996

[54] REMOVAL OF MERCURY AND CADMIUM AND THEIR COMPOUNDS FROM INCINERATOR FLUE GASES

[75] Inventor: Bernard J. Lerner, Pittsburgh, Pa.

[73] Assignee: Beco Engineering Company, Oakmont, Pa.

[21] Appl. No.: 406,518

[22] Filed: Mar. 20, 1995

Related U.S. Application Data

[63] Continuation of Ser. No. 73,940, Jun. 10, 1993, abandoned.

[51] Int. Cl.$^6$ ............................. B01D 50/00; C01B 7/00
[52] U.S. Cl. ..................... 422/170; 422/169; 422/172; 422/173; 110/235; 423/240 R; 423/240 S; 423/210; 95/134
[58] Field of Search .................. 422/169, 170, 422/172, 173, 188; 110/235, 255; 423/240 R, 240 S, 210; 95/134

[56] References Cited

U.S. PATENT DOCUMENTS

| | | | |
|---|---|---|---|
| 3,601,070 | 8/1971 | Lambiris | 110/10 |
| 4,019,444 | 4/1977 | Kleeberg et al. | 110/7 R |
| 4,196,173 | 4/1980 | deJong et al. | 423/210 |
| 4,274,842 | 6/1981 | Linda et al. | 95/134 |
| 4,619,608 | 10/1986 | McIntyre et al. | 423/220 |
| 4,620,492 | 11/1986 | Vogg et al. | 110/345 |
| 4,708,853 | 11/1987 | Matviya et al. | 423/210 |
| 4,729,882 | 3/1988 | Ide et al. | 423/240 R |
| 4,795,619 | 1/1989 | Lerner | 423/244 |
| 4,844,875 | 7/1989 | Ettehadieh | 423/210 |
| 4,865,828 | 9/1989 | Lerner | 423/244 |
| 4,889,698 | 12/1989 | Moller et al. | 423/210 |
| 5,002,743 | 3/1991 | Kokkonen et al. | 423/244 |
| 5,009,871 | 4/1991 | Higuchi et al. | 423/240 |
| 5,018,457 | 5/1991 | Brady et al. | 110/346 |
| 5,021,229 | 6/1991 | Gullett | 423/245.3 |
| 5,035,188 | 7/1991 | Johnson et al. | 110/345 |
| 5,185,134 | 2/1993 | Gullett | 423/240 R |
| 5,209,912 | 5/1993 | Suchenwirth | 423/210 |
| 5,346,674 | 9/1994 | Weinworm et al. | 423/210 |
| 5,352,420 | 10/1994 | Kurzinger et al. | 423/210 |

FOREIGN PATENT DOCUMENTS

| | | |
|---|---|---|
| 0066707 | 12/1982 | European Pat. Off. . |
| 0169997 | 2/1986 | European Pat. Off. . |
| 0208036 | 1/1987 | European Pat. Off. . |
| 0496432 | 7/1992 | European Pat. Off. . |
| 2817272 | 10/1979 | Germany . |
| 142534 | 7/1980 | Germany . |
| 3702306 | 8/1988 | Germany . |
| 0405290 | 1/1991 | Germany . |
| 4008099 | 9/1991 | Germany . |
| 62-216630 | 9/1987 | Japan . |
| 4045827 | 2/1992 | Japan . |
| 4087624 | 3/1992 | Japan . |
| 640750 | 1/1979 | U.S.S.R. . |
| 9011817 | 10/1990 | WIPO . |
| 9200794 | 1/1992 | WIPO . |
| 9308902 | 5/1993 | WIPO . |

OTHER PUBLICATIONS

"Status of EPA Regulatory Development Program for Medical Waste Incinerators—Results of Emission Test Program", Durkee et al., 11th Annual Incinerator Conference, Alburquerque, New Mexico, May 1992.

(List continued on next page.)

Primary Examiner—Robert J. Warden
Assistant Examiner—Christopher Kim
Attorney, Agent, or Firm—Roylance, Abrams, Berdo & Goodman, L.L.P.

[57] ABSTRACT

Toxic metal vapor phase compounds, and in particular, mercury and cadmium, are removed from waste incinerator combustion gases by contact with dry alkaline material and dry activated carbon followed by solids separation. The resulting gas is subjected to quench/wet scrubbing with recycle hydrochloric acid solution formed in situ by absorption of HCl from the gas. Blowdown liquid withdrawn from the recycle acid liquor, may be recycled to the incinerator or further treated by neutralization, precipitation, and filtration of the precipitated toxic metals.

12 Claims, 1 Drawing Sheet

OTHER PUBLICATIONS

"Mercury Chemistry in Simulated Flue Gases Related to Waste Incineration Conditions", Hall et al., Env. Science & Tech., vol. 24, pp. 108–111, (1990).

"Application of Dry Flue Gas Scrubbing to Hazardous Waste Incineration", Kroll et al., J. of Air Pollution Control Assoc., vol. 36, No. 11, Nov. 1986, pp. 1258–1263.

"Dry Sorbent Emission Control Technologies", Muzio et al., J. of Air Pollution Control Assoc., vol. 37, May 1987, pp. 642–653.

"Grant and Hackh's Chemical Dictionary", Grant, R., et al., 5th ed., McGraw–Hill: New York (1989), p. 248.

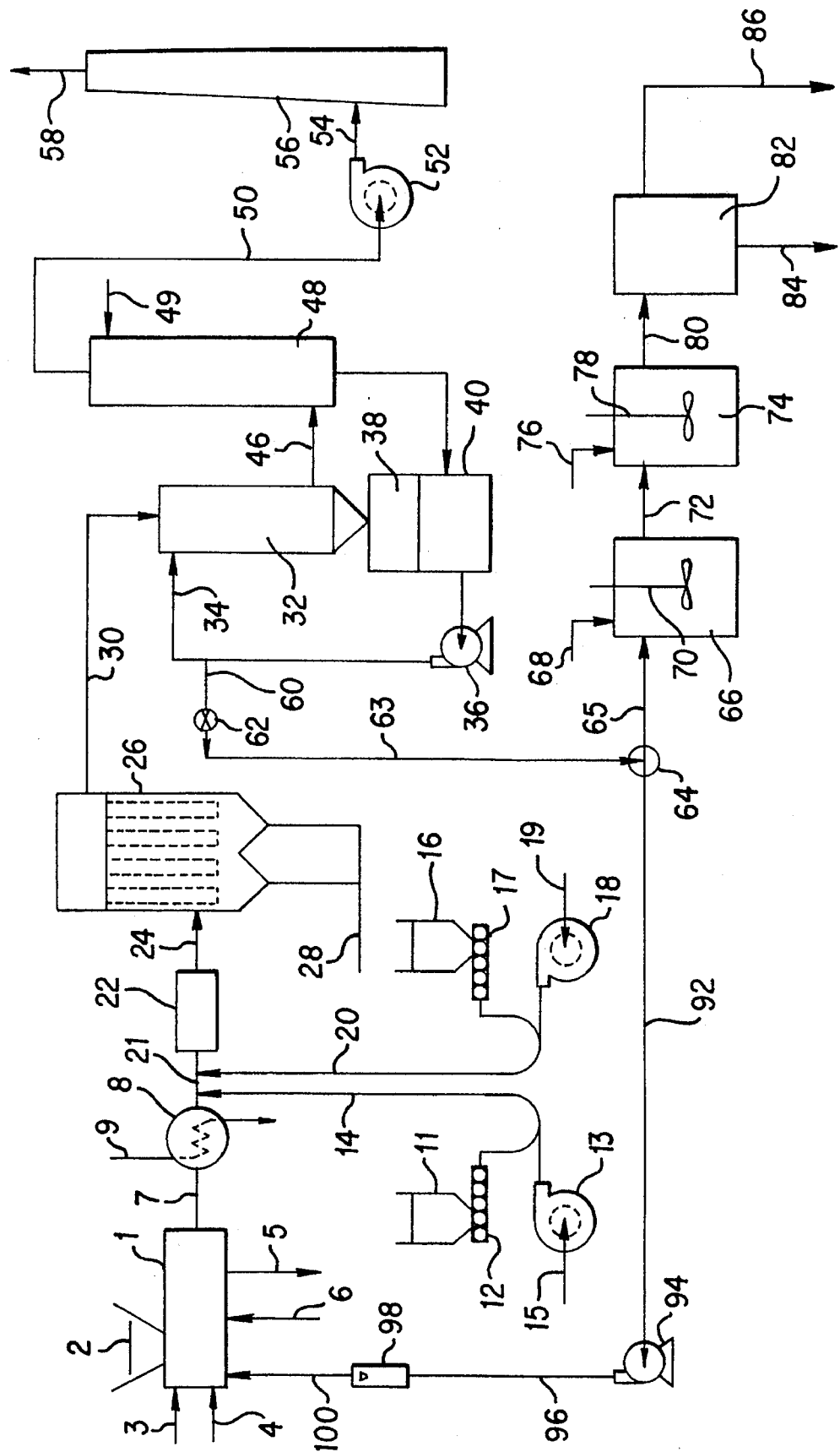

REMOVAL OF MERCURY AND CADMIUM AND THEIR COMPOUNDS FROM INCINERATOR FLUE GASES

This is a continuation of application Ser. No. 08/073,940 filed Jun. 10, 1993, now abandoned.

CROSS-REFERENCE TO RELATED APPLICATION

Reference is hereby made to U.S. patent application Ser. No. 07/712,475, filed Jun. 10, 1991, now U. S. Pat. No. 5,238,665 to Bernard J. Lerner entitled "Method for Minimizing Environmental Release of Toxic Compounds in the Incineration of Wastes", the disclosure of which is hereby incorporated by reference.

FIELD OF THE INVENTION

This invention relates to removal of vapor phase toxic metal compounds from exhaust gases resulting from incineration of wastes and apparatus for effecting such removal.

BACKGROUND OF THE INVENTION

Incineration of municipal solid wastes (MSW), biomedical wastes (BMW), and the like, produce combustion products containing various toxic metals. These metals and their compounds are known to be inimical to human health. Most of the toxic metals oxidize and condense to particulate form on cooling, and can therefore be filtered out by appropriate filter means. However, some toxic metals, particularly mercury and cadmium and their halogen and oxide compounds, tend to remain in vapor form on cooling from combustion temperatures. These metals and their compounds are not removable by filtration. On the other hand, these metals and compounds are toxic at the vapor phase concentrations that exist in the typical combustion gases and stack emissions. The environmental standards of several states now require a limit on mercury emissions of 50 micrograms per dry standard cubic meter (ug/DSCM), and 50 ug/DSCM for cadmium and thallium combined corrected to a reference concentration of oxygen or carbon dioxide content in the gas.

In the presence of hydrochloric acid (HCl) in the gas, mercury and cadmium compounds found in the waste combustion gases from MSW and BMW incineration are predominantly in the form of uncondensed vapor-phase chlorides. On cooling from the elevated combustion temperatures, both mercury and cadmium react as elements or as oxides with the HCl in the gas to form the vapor-phase chlorides.

It is known in the art that gas-phase mercury and cadmium chlorides may be removed from combustion gases by adsorption on high surface area sorbents, such as activated carbon, or by wet scrubbing with aqueous solutions. Wet scrubbing, which comprises treating the cooled combustion gases with an aqueous scrubbing solution in an efficient gas-liquid contactor, is conventionally employed to remove the acid gases, HCl and $SO_2$, from the combustion gases. Wet scrubbers typically use an aqueous solution of alkali metal or alkaline earth carbonate or hydroxide for neutralization of the absorbed HCl. Although effective for HCl and $SO_2$ removal, wet scrubbing has been found to be only partially effective for mercury and cadmium removal. This is chemically somewhat contradictory because both $HgCl_2$ and $CdCl_2$ are known to be very soluble in aqueous systems. The metal chlorides, $HgCl_2$ and $CdCl_2$, form dissolved chloride complexes in solution which have extremely low vapor pressures, and aqueous wet scrubbing would theoretically be expected to be very efficient for mercury/cadmium compound removal. However, this has not proved to be true in application.

The reasons for the failure of wet scrubbing when applied to removal of mercury compounds from waste incinerator combustion exhaust gases have been pointed out in U. S. Pat. No. 5,009,871 to Higuchi et al. The mercury compounds in solution were found to be highly susceptible to reduction to the elemental metal phase by reducing agents formed in situ in the absorbing liquor. The vapor pressure of the elemental metals is very high compared to the vapor pressure of the dissolved chloride compounds, and the slightest degree of reduction in the liquor system will generate mercury or cadmium as a separate metal phase and drastically increase their stack emission levels.

As is typically the case when absorbing residual HCl from the gas, the pH in a combustion gas wet scrubber is maintained above pH=7 by alkali injection. Higuchi et al. found that $SO_2$ in the gas was absorbed in their caustic scrubbing solution to form alkaline sulfites and bisulfites. These are excellent reducing agents, and served to reduce the absorbed $HgCl_2$ to elemental mercury.

Higuchi et al. determined the net absorption of mercury compounds in the gas to be a function of the chemical oxygen demand (COD, or reducing ability) of the caustic solution. At high COD levels (150 milligrams/liter), the net removal of mercury from the gas was found to be less than 10 percent. Higuchi et al.'s solution to this problem was to add compensating oxidizers, such as sodium hypochlorite, to the solution to prevent reduction of the dissolved mercury compounds. This is an expensive expedient. The COD balance is difficult to control by such means and the hypochlorite is an undesirable and corrosive contaminant. Even with adjusted solution COD (non-reducing solutions) the degree of mercury removal reported by Higuchi et al. for wet scrubbing yielded mercury emissions that were far in excess of the 50 ug/DSCM standard.

Removal of mercury and cadmium chlorides from combustion gases using activated carbon adsorption is also known in the art. U.S. Pat. No. 4,889,698 to Moller et al. discloses activated carbon addition in, upstream or downstream of, a spray drier scrubber for mercury and dioxin removal. Use of a powdered activated carbon as a supplement to spray drier technology was found to improve the removal of chlorodibenzo-dioxins and chlorodibenzofurans (hereinafter referred to as dioxins and furans) and mercury. Moller et al. found that efficient removal of the pollutants with powdered activated carbon adsorbent in spray drier scrubbing occurs when sufficient water is evaporated to cool the flue gas to 110° C.–130° C.

The normal gas cooling means in both MSW and BMW incineration is a waste heat boiler, and a conventional waste heat boiler cools the combustion gases to the 175° to 250° C. range, which is well above Moller's preferred lower sorption temperature levels. In a series of field tests, the U.S. Environmental Protection Agency (EPA) found mercury compound removal by activated carbon in the 160° to 250° C. range to yield residual gas-phase mercury levels that were highly excessive when compared to a 50 ug/DSCM emission limit. The results of an EPA test program of medical waste incinerator emissions, using activated carbon powder injection into the combustion gas, were reported in a paper by K. R. Durkee and J. A. Eddinger, entitled "Status of EPA Regulatory Program for Medical Waste Incinerators—Results of Emission Test Program", presented at the 11th Annual Incineration Conference, Albuquerque, N. Mex., May, 1992. Carbon injection downstream of waste heat boilers, followed by fabric filtration, gave exit gas mercury concentrations that were in the range of 284 to 587 ug/DSCM. Clearly, activated carbon treatment of the gas does not provide the required degree of removal to achieve compliance with a 50 ug/DSCM emission specification.

While both wet scrubbing and activated carbon systems have the capability for removal of toxic metal chlorides from the combustion gases, neither has the capability for removal of the elements or their oxides from the gas. Hall, Lindquist and Lungstrom, in an article entitled, "Mercury Chemistry in Simulated Flue Gases Related to Waste Incineration Conditions", in "Environmental Science and Technology", pp. 108–111, Volume 24 (1990) reported experiments on mercury removal with activated carbon. In the absence of HCl in the gas, only 13 to 20% of the mercury vapor was absorbed by the carbon over a temperature range of 160° to 500° C.

Further, the remaining vapor-phase mercury content was catalytically converted by the carbon to mercuric oxide. Therefore, in the absence of sufficient HCl in the gas to convert the mercury/cadmium metals and oxides to adsorbable chlorides, activated carbon adsorption does not provide significant removal of these toxic compounds. Additionally, because only the chloride form of these toxic metals is soluble in aqueous solutions, wet scrubbing does not remove elemental mercury, cadmium or their oxides from the gases.

SUMMARY OF THE INVENTION

A process useful for reducing toxic emissions of mercury, cadmium and thallium in waste exhaust gases has now been discovered, which process involves contacting waste exhaust gases containing mercury, cadmium and/or thallium in chloride form and HCl with (a) substantially dry, finely divided alkaline material, and (b) substantially dry, finely divided high surface area, solid sorbent material for removal of a major portion of the toxic metal chloride from the waste exhaust gas stream. The toxic metal chloride-depleted gas stream is then passed to a solids separation zone for removal of particulate matter comprising fly ash, spent alkaline solids and spent sorbent, and the substantially particulate matter-free gas stream is then passed to a wet scrubber zone in which recycled acid liquid absorbs residual toxic metal compounds from the gas stream to provide a substantially toxic metal-free gas stream. Use of recycle acid liquid in the wet scrubber zone for absorption of the toxic metal chlorides provides the added advantage of preventing sulfite reduction of the metal chlorides in the wet scrubber resulting in generation of an undesirable increase in toxic metal stack emissions.

Surprisingly, it has been discovered that the process of the present invention removes toxic metals, such as mercury and cadmium, from waste exhaust gases formed by incineration of wastes to the extent necessary to comply with emission specifications.

In order for either carbon adsorption or wet scrubbing to be at all effective, a minimum level of HCl is needed in the gas phase to react with the elements or their oxides and convert them to chlorides. Because of the presence of chlorine-containing plastics, BMW and MSW incineration will normally have sufficient HCl amounts in the gas to convert the mercury and cadmium to chlorides. However, in the combustion of mercury-containing wastes such as wood wastes, coal, and the like, there frequently will be insufficient chlorinated compounds, or other hydrochloric acid-generating substances, in the material to fully convert the toxic metals in the gas to chlorides. The mercury and cadmium in the combustion gases would then be in elemental or oxide form.

It is apparent that an improved system is needed to remove toxic metals, such as mercury and cadmium from such exhaust gases to the required degree to achieve compliance with emission specifications.

According to a preferred embodiment of the present invention, hydrochloric acid or a hydrochloric acid-generating material is added to the wastes in the incineration zone for conversion of mercury, cadmium or thallium present in such wastes to chloride form during incineration in said waste incineration zone. This embodiment of the present invention enables removal of toxic metals to the desired degree from chlorine deficient wastes, such as wood wastes, coal or the like, by means of the process of the present invention.

According to another embodiment of the present invention, gas removed from the wet scrubber zone is passed to a second scrubber zone for removal of residual hydrochloric acid from the gas stream. While the presence of hydrochloric acid in the initial wet scrubber zone is required for optimal absorption of the mercury and cadmium chlorides, removal of hydrochloric acid from the resulting gases is required prior to their release to the atmosphere because of existing emissions specifications. Accordingly, this embodiment of the present invention enables adequate removal of residual hydrochloric acid.

According to a further embodiment of the present invention, blowdown liquid from the wet scrubber is recycled to the waste incineration zone. This embodiment of the present invention enables the system to achieve zero liquid discharge and avoid the expense and attendant problems involved in liquid treatment to provide clean liquid for discharge.

According to another embodiment of the present invention, an apparatus is provided for minimizing release to the environment of toxic metals in exhaust gases, such apparatus comprising incinerator means, means for introducing combustibles or wastes to said incinerator means, gas-cooling means communicating with said incinerator means, a first gas-treating means communicating with said gas-cooling means, said first gas-treating means comprising means for contacting gas with finely-divided alkaline solids and finely-divided activated carbon, solids separation means communicating with said first gas-treating means, second gas treating means communicating with said first gas treating means for incremental removal of the toxic metals and acid gas, liquid storage means associated with said second gas treating means, means for recirculating acid liquor to said quench/wet scrubber means from said liquor storage means, means for withdrawal of an acid blowdown stream for further treatment, and tail-gas wet scrubber means communicating with said quench/wet scrubber means.

In a further embodiment of this invention, the contaminated acid blowdown liquor from the wet scrubber is treated by neutralizing the acid liquor, precipitating the toxic metals, and filtering off the precipitated solids from the neutral liquid. In the initial liquid treatment stage, the acid content of the liquid is neutralized with a suitable alkaline agent such as an alkali metal or alkaline earth hydroxide or carbonate, or solution thereof, and the toxic metal content of the neutralized liquid is then precipitated by reaction with added sulfides. The precipitated solids are filtered off from the neutral liquid, and the liquid is discharged.

Other objects, advantages and salient features of the present invention will become apparent from the following detailed description, which, taken in conjunction with the annexed drawing, discloses preferred embodiments of the invention.

BRIEF DESCRIPTION OF THE DRAWING

The drawing is a schematic flow diagram illustrating the system according to the invention.

DETAILED DESCRIPTION OF THE INVENTION

Referring to the drawing, mercury, cadmium and/or thallium-containing wastes are fed to incinerator 1 through ram or chute 2. Incinerator 1 is heated by burning natural gas supplied by line 3 in air supplied by line 4 at a temperature in the range of from about 600° C. to about 1250° C., preferably from about 850° C. to about 1150° C., while under substantially atmospheric pressure until combustion of the wastes provides sufficient heat to sustain the necessary incinerator temperatures. Incinerator 1 may be a single or multi-stage incinerator of conventional design, operating within the aforesaid temperature ranges. If multi-stage operation is desired, the initial stage may be, for example, a pyrolysis (low-temperature, starved-air) stage and the successive stages may be higher temperature after-burner stages. Bottom furnace ash is removed from the incinerator by means of line 5, while an HCl-generating material is optionally fed to the incinerator by means of line 6 if the wastes have insufficient chlorine content to provide for conversion of mercury and cadmium compounds to the chloride form.

The process of the present invention depends on the presence of sufficient HCl in the waste combustion gases to react with the mercury, cadmium and/or thallium metals and oxides to yield conversion to the metal chlorides. It is only the mercury, cadmium or thallium chlorides that are significantly adsorbable by activated carbon sorbents and absorbable in aqueous solution. In the combustion of wood, coal and other wastes that are chlorine-deficient in this respect, i.e., do not generate sufficient HCl to effect the conversion of the vaporized metals and oxides to chlorides, it is advantageous to add to the waste a material that will generate HCl on combustion. Although HCl gas may be added to the hot combustion gases, it is preferable that the required chloride-containing material be added in solid or liquid form to the waste to be combusted. Preferably, a solid chlorinated organic material, such as scrap polyvinyl chloride plastic, is added to the waste in amounts corresponding to the generation of from about 2 to about 30 pounds of HCl per 1000 pounds of waste, and preferably from about 5 to about 15 pounds of HCl per 1000 pounds of waste.

The deliberate addition of an HCl-generating material to the wastes fed to an incinerator may be seen as totally contradictory to the objective of decreasing and controlling toxic or acid gas emissions. For example, it is known that chlorides in the waste contribute to production of toxic chlorinated organics, such as dioxins and furans, in the incinerator exhaust gases. However, it is well established in the art that activated carbon contacting, which is an integral part of this invention, is highly effective in removing dioxins and furans. Therefore, an increase in removable toxics in the gas does not equate to increased emissions, as long as adequate specific toxicant removal capacity is provided, as in the emission control system of the present invention.

Referring again to the drawing, combustion exhaust gases exit incinerator 1 by means of line 7 to waste heat boiler 8. The incineration waste gases are preferably cooled in a heat exchanger or other means to cool the gases, such as a waste heat boiler, to a temperature in the range of from about 150° C. to about 290° C., preferably from about 175° C. to about 235° C. In waste heat boiler 8, boiler water feed is converted to steam in line 9. The gas temperature exiting waste heat boiler 8 is preferably at a temperature compatible with fabric filtration or electrostatic precipitator solids collection. Dry powdered alkaline solids, such as hydrated lime, are fed from hopper 11 to screw feeder 12 and then to pneumatic feed line 14, supplied by blower or compressor 13 operating on an air stream supplied at line 15. Any suitable alkaline solids may be employed, for example, alkaline earth metal hydroxides, carbonates and bicarbonates, as well as alkali metal hydroxides, carbonates and bicarbonates. Preferred alkaline solids include hydrated lime and sodium bicarbonate. The alkaline reagent is added at a rate sufficient to maintain a stoichiometric ratio with the HCl content of the gas of from about 1 to about 3, and preferably from about 1.5 to about 2.5. The alkaline material is preferably used in finely divided form, preferably having an average particle diameter in the range of from about 10 to about 70 microns, with from about 20 to about 40 microns being especially preferred.

Powdered activated carbon is fed from hopper 16 to screw feeder 17 and then to a pneumatic feed line 20, supplied by blower or compressor 18 operating on air from line 19. The dry activated carbon powder is injected into the gas at a rate of from about 1 to about 6 pounds of carbon per 1000 pound of waste burned, preferably from about 2 to about 4 pounds of carbon/1000 pounds of waste, to effect adsorption of the mercury/cadmium chlorides. Any high surface area solid sorbent having an affinity for mercuric chloride, for example, sorbents having a surface area above about 100 square meters per gram, preferably, above about 300 square meters per gram, may be utilized in the process of the present invention. For example, activated carbon, fuller's earth, bentonite or montmorillonite clays may be utilized. The sorbent is preferably utilized in finely divided form, preferably having an average particle diameter in the range of from about 10 to about 70 microns, with from about 20 to about 40 microns being especially preferred. Although the drawing shows addition of alkaline material prior to solid sorbent material, such materials may be added in any order desired, and thus, sorbent material may be added prior to alkaline material in the process depicted in the drawing.

The pneumatically-conveyed solids are added to the incinerator flue gas in line 21 and passed to distributor device 22. Preferably, mixing takes place in process line 21, so that mixing device 22 is a vortex inducing baffle or other turbulence-inducing in-line device in process line 21. However, if desired, a separate dry mixing vessel 22 may be utilized prior to passing the dry mixture of gases, alkaline reagent and solid sorbent by means of process line 24 to solid separator zone 26. Spent activated carbon powder, reacted alkaline reagent and fly ash, are separated from the gas stream in separation zone 26 by a suitable solids separation means such as a fabric filter, electrostatic precipitator (ESP) or cyclones. A filter baghouse is preferred. Activated carbon powder, reacted alkaline solids and fly ash are removed, for example, in baghouse 26 and conveyed by means of line 28 to disposal or collection bins (not shown).

Particulate-free gas exhausting from solids separation zone 26 still contains residual HCl and excessive levels of mercury and cadmium chlorides and is passed by means of line 30 to a quench/wet scrubber 32 in which the gas is simultaneously evaporatively cooled and wet scrubbed by means of acid stream 34 recirculated by recycle pump 36. Acid liquid, preferably HCl, formed in situ, leaves quench/wet scrubber 32 and is stored in liquid receiver 38, containing liquid reservoir 40. Acid recycle stream 42 is withdrawn by recycle pump 36 from recycle liquid receiver 40, and is circulated by means of lines 44 and 34 to the top of the quench/wet scrubber 32. The clean gas is contacted in quench/wet scrubber 32 with an acid solution, preferably an HCl solution, to absorb the toxic mercury/cadmium/thallium compounds and to yield concentrations of these compounds in the treated exhaust gas that are in compliance with emission standards. Because BMW and MSW gases normally contain HCl, an HCl solution suitable for the acid wet scrubbing means of this invention is generated in situ simply by recycle of part of the absorbing liquor in the quench/wet scrubber means.

A significant advantage of using an HCl solution for absorption of $HgCl_2$ and $CdCl_2$ is the fact that $SO_2$ is substantially insoluble in HCl solutions. Therefore, by using the hydrochloric acid wet scrubbing solution of this invention, reduction of $HgCl_2$ or $CdCl_2$ to elemental mercury or cadmium, respectively, by sulfites cannot occur in quench/wet scrubber 32, and there is no need for addition of oxidants, as in the Higuchi et al. process. Further, the mercury and cadmium chlorides form highly stable complexes, such as $H_2(HgCl)_4$, in HCl solution, and the degree of removal for the metal chlorides is higher in HCl solutions than by alkaline solutions. There is no addition of any alkaline neutralizing agent to the quench/wet scrubber or tail-gas scrubbing stages, and consequently no sodium chloride salt formation in the scrubbing liquor. Absence of sodium salts in the liquor allows incineration of the acid liquor without damage to the refractory lining of the incinerator.

The recycle acid concentration in quench/wet scrubber stage 32 is from about 2 to about 14 weight percent, with a preferred operating range being from about 4 to about 10 weight percent HCl. Gas leaving quench/wet scrubber section 32 is passed by means of line 46 for contact with water in tail-gas scrubbing contactor 48 in which the gas is contacted, preferably in a countercurrent manner by water fed by make-up water stream 49 as shown.

The gas leaving the recycle quench scrubbing zone 32 will be in equilibrium with the HCl concentration in the recycle liquor, and the gas concentration will typically be higher than the allowed emission. To achieve HCl emission compliance levels, the exhaust gas is treated in a tail-gas scrubbing zone 48 in which the scrubbing liquid feed to the tail-gas contactor zone 48 is the make-up water needed to maintain the liquid inventory in the initial quench/wet scrubbing gas treatment. The make-up water rate is the sum of the quench evaporation rate and the quench/wet scrubber recycle liquor blowdown rate, and is typically more than ample for operation of a second wet scrubbing stage. Spray, tray or differential contacting means may be employed in tail-gas wet scrubbing zone 48. Exhaust liquor from the tail-gas contactor zone 48 is added back to the quench/wet scrubber recycle liquor sump by means of line 51 to maintain a constant liquor inventory in quench/wet scrubber 32. Clean gas stream 50 is passed by means of blower 52 and line 54 to stack 56 for exhaust to the atmosphere by means of line 58.

Any desired configuration conventionally used for gas-liquid contact can be used for scrubbers 32 and 48. Thus, scrubbers 32 and 48 can be countercurrent, cocurrent, cross-flow, spray, non-packed, packed or tray gas-liquid contactors.

Use of the hydrated lime in the dry reaction stage 22 allows reduction of the acid load to the downstream wet scrubber 32, and reduction in scrubber acid recycle strength and subsequent blowdown treatment costs. Additionally, the lime-carbon-fly ash solids mixture discharged from the solid separation means lends itself to stabilization means known to the art whereby leaching of the toxic metal contaminants is prevented, and an environmentally secure form of solids disposal and storage may be achieved.

A blowdown acid liquid stream may be passed by means of line 60, valve 62, line 63, three-way valve 64 and line 65 to precipitation vessel 66. The blowdown stream is taken off recirculated acid liquid stream 44 at a rate sufficient to maintain a constant controlled acid concentration in the recycle liquor in quench/wet scrubber zone 32.

Alkaline neutralizing reagent in vessel 66 is supplied by line 68 and is mixed with the acid liquid using mixer 70 and reacts with the acid in solution to yield a neutral solution. The neutral solution is passed by means of conduit 72 to precipitation vessel 74. A sulfide precipitation agent is added by means of line 76 and mixed with the toxic metal solution in vessel 74 using mixer 78. The resulting slurry is withdrawn by line 80 and passed to filter zone 82 using, for example, a plate and frame press. Precipitated toxic metal solids are withdrawn by means of line 84 and contaminant-free liquid is discharged through conduit 86.

According to a preferred embodiment of the present invention, acid liquor in stream 63 is bled off recycle liquid stream 44 through line 60 and valve 62 and is directed by means of three-way valve 64, line 92, pump 94, conduits 96 and 100, at a rate metered by flowmeter 98 to incineration zone 1. An optional holding tank (not shown) for the acid liquid blowdown may be provided in line 92 to store acid liquid until needed. The aqueous acid liquor blowdown passed to incinerator 1 is vaporized therein and the mercury/ cadmium/ thallium chloride compounds so generated are largely removed from the effluent combustion gases by the activated carbon sorption/solids separation means. Because the adsorption gas treatment stage removes the major fraction of the toxic metal contaminants, the remaining gas-phase concentrations going to the absorption wet scrubber are only slightly higher than the levels in the non-blowdown recycle embodiment of this invention. The blowdown return to the incinerator does not represent a significant incremental contaminant load in the incinerator or to the adsorber stage. By recycling the acid liquor to incineration zone 1, zero liquid discharge of the waste liquid from the quench/wet scrubber zone 32 is achieved, eliminating the need for solid separation vessels 66, 74 and 82.

The invention will be further illustrated by the following examples. It should be understood that the examples are not intended to limit the scope of this invention. The percentages are by weight unless otherwise specified.

EXAMPLE 1

One thousand pounds per hour of medical wastes, containing an average chloride content equivalent of 11.8 kg/hr. (26 lb./hr.) of HCl, are burned in a hospital incinerator. The incinerator exhaust gas flow is measured as 4052 dry standard cubic meters per hour (DSCM/hr.). Average mercury and cadmium gas concentrations generated by waste incineration analyze as 2150 and 3280 ug/DSCM, respectively.

The gas HCl concentration analyzes as 1563 ppmv. All gas analysis figures are corrected to 7 percent oxygen content in the gas. Applicable emission standards are 50 ug/DSCM for mercury and cadmium, and 50 ppmv for HCl.

The hot gas leaves the incinerator at 985° C. and enters a 2-pass waste heat boiler, where it is cooled to 210° C. The cooled gas is passed by means of a conduit or duct to a fabric filter baghouse. Hydrated lime powder is introduced into the gas in the baghouse inlet duct by pneumatic conveyance at a rate of 24 kg/hr. (52.8 lb./hr.), which is equivalent to a stoichiometric ratio of approximately 2.0, based on entering gas HCl content. Powdered activated carbon at a rate of 0.9 kg/hr. (2 lb./hr.) is also introduced into the gas in the baghouse inlet duct. The lime and activated carbon are dispersed in the hot gas in the baghouse approach duct by means of a vortex-inducing baffle. The baghouse has a cloth area of 1336 square feet (124 square meters) providing for a maximum 5:1 air/cloth ratio, using 14-foot (4.3 meter) long bags.

In the approach duct to the baghouse and in the baghouse, 80 percent of the entering HCl is removed by the lime, and about 90 percent and 99 percent, respectively, of the mercury and cadmium chlorides are removed by the carbon. The solids filter cake discharged from the baghouse comprises 14.4 kg/hr. (31.7 lb./hr.) of calcium chloride, an equal amount of unreacted $Ca(OH)_2$, and 0.93 kg/hr. (2.04 lb./hr.) of fly ash. The baghouse outlet gas contains 313 ppmv (5.21 lb./h) of HCl, and mercury and cadmium concentrations of 230 and 6 ug/DSCM, respectively.

The hot gases leaving the baghouse are quenched to the gas wet bulb temperature of 58.9° C. (138° F.) in a downflow quench/wet scrubber. The quench/wet scrubber operates with recycle liquid sprays maintained at 6 percent HCl concentration by means of a conductivity controller operating a blowdown valve. Acid liquor is recycled from a quench/wet scrubber liquid storage sump at the bottom of the downflow quench. Approximately 90 percent of the residual mercury chloride and 50 percent of the remaining cadmium chloride are removed in the quench/wet scrubber, as well as a portion of the remaining HCl. Approximately 5.3 liters/minute (1.4 GPM) of water evaporate, and 37.8 liter/hr. (10 gallons/hr.) are withdrawn from the recycle liquor for treatment. No neutralizing agent is added to the acid, and the quench/wet scrubber is fabricated of thermoplastic and thermoset resin materials which are fully corrosion-resistant to the acid.

The gas leaving the quench is treated in a tail-gas wet scrubber comprising a vertical-upflow multi-tray countercurrent contactor. Feed water to the top of the scrubber is at a rate of 5.9 liters/minute (1.6 GPM), equal to the upstream evaporation rate plus liquid blowdown rate from the upstream quench/wet scrubber. After the tail-gas wet scrubber treatment of the gas, the gas is exhausted by means of a blower to the atmosphere. By analysis, the HCl concentration in the gas is 10 ppmv, uncorrected, equivalent to an emission rate of 75.8 grams/hr (0.167 lb./hr.). The moisture content of the exhaust gas is 12.7 volume percent. The mercury content of the gas analyzes as 20 ug/DSCM, and the cadmium as 3 ug/DSCM, both corrected to 7 percent $O_2$. The mercury, cadmium and HCl contents of the exhaust gas are all well within compliance limits.

The 37.8 liters/hr. of contaminated acid liquid blow-down is taken off the quench scrubber recycle contains 1.054 grams of dissolved mercury and 1.61 grams of cadmium. To avoid discharge of this stream, the contaminated blowdown stream is pumped into a mixing tank and neutralized by the addition of a dilute caustic solution under pH control to an endpoint of pH=7–8. The neutralized liquor is pumped to a precipitation tank where a sulfide precipitation agent is added and mixed with the liquid. The slurry containing the suspended metal sulfide solids is pumped to a plate and frame filter press, in which the solids are removed. The effluent decontaminated neutral liquid is discharged to sewer.

EXAMPLE 2

Using the conditions of Example 1, the 37.8 liters/hr. of contaminated acid liquid blowdown taken off the quench scrubber recycle, is sent to a holding tank. A metering pump, having a capacity of 100 liters/hr., constructed of HCl-compatible plastic, pumps the contaminated acid on an intermittent basis into the combustion zone through a retractable titanium lance mounted in the incinerator wall. The average acid and mercury gas concentrations leaving the incinerator are increased by an average of 13.6 percent. The cadmium concentration remains unchanged. The concentration of mercury increases by only 13.5 percent in the baghouse exit gas, and the stack emissions are the same as in Example 1.

EXAMPLE 3

One thousand pounds per hour of coal, having no chlorine content, are burned in a fire-tube steam boiler. The boiler exhaust gas flow is measured as 4052 dry standard cubic meters per hour (DSCM/hr.). Average mercury and cadmium gas concentrations analyze as 4350 and 1530 ug/DSCM, respectively. The mercury and cadmium in the gas phase are entirely in elemental metal or oxide form. Applicable emission standards are 50 ug/DSCM for Hg and 20 ug/DSCM for the Cd. To convert the mercury/cadmium to chloride form, and to provide for excess HCl, 5 kg/hr. (11 lb/hr.) of ground scrap vinyl plastic, having a chlorine content of 45 percent by weight are added to the coal feed. The combustion gases are cooled and treated as in Example 2, and the stack emissions are 8 ug/DSCM for Hg, 2 ug/DSCM for Cd, and 10 ppmv for HCl.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification.

What is claimed is:

1. Apparatus for minimizing the environmental release of acid gas and toxic metal compounds in the exhaust gases from an incinerator, said apparatus comprising:

incinerator means having inlet means for introducing toxic-metal containing wastes to said incinerator and outlet means for discharge of exhaust gases, gas-cooling means communicating with said incinerator outlet means having an inlet means for receiving exhaust gases and an outlet means, a first gas-treating means communicating with said gas-cooling outlet means for contacting said gas with substantially dry, finely-divided alkaline solids, a second gas treating means communicating with said gas-cooling outlet means for contacting gases with substantially dry, finely-divided high surface area sorbent, solids separation means for removal of dry solids and fly ash particulate having an inlet means and an outlet means;

conduit means communicating with said gas-cooling outlet means for passing gases contacted with said alkaline solids and high surface area sorbent to said inlet means of said solids separation means for the removal of dry solids and fly ash particulate in said solids separation means;

said outlet means of said solid separation means communicating with a third gas treating means for incremental removal of the toxic metals and acid gas comprising a quench/wet scrubber means for dissolution of residual toxic metal compounds and acid gases, means for storing acid liquor draining from said quench/wet scrubber means, means for circulating acid liquor to said quench/wet scrubber means from said liquor storage means, means for withdrawal of an acid blowdown stream containing dissolved toxic metals from said circulation means for further treatment, and tail-gas wet scrubber means communicating with an outlet means from said quench/wet scrubber means.

2. The apparatus of claim 1, wherein said means for withdrawal of an acid blowdown stream from said circulation means communicates with said incinerator means for incineration of dissolved toxic metals in said acid blowdown stream.

3. The apparatus of claim 1, wherein said means for withdrawal of an acid blowdown stream from said circulation means communicates with precipitation means and said precipitation means communicates with solids separation means for separation of dissolved toxic metals from said acid blowdown stream.

4. The apparatus of claim 1, wherein said gas cooling means comprises a waste heat boiler.

5. The apparatus of claim 1, wherein said solids separation means comprises a fabric filter baghouse.

6. The apparatus of claim 1, wherein said solids separation comprises an electrostatic precipitator.

7. The apparatus of claim 1, wherein said tail-gas scrubber means comprises a countercurrent contactor.

8. The apparatus of claim 1, wherein said incinerator comprises means for introducing HCl or HCl-generating material.

9. The apparatus of claim 1, wherein said means for withdrawal of an acid blowdown stream communicates with valve means, said valve means being movable between a first position communicating said means for withdrawal of an acid blowdown stream with precipitation means and a second position communicating said means for withdrawal of an acid blowdown stream with said incineration means, said precipitation means communicating with solids separation means for separation of dissolved toxic metals from said acid blowdown stream.

10. The apparatus of claim 1, wherein said sorbent has a surface area above about 100 square meters per gram.

11. The apparatus of claim 10, wherein said sorbent has a surface area above about 300 square meters per gram.

12. The apparatus of claim 10 wherein said alkaline solids are in dry powdered form.

* * * * *